(12) United States Patent
Krinkin et al.

(10) Patent No.: US 11,414,152 B2
(45) Date of Patent: Aug. 16, 2022

(54) TWO WHEEL AUTOMATIC GUIDED VEHICLES

(71) Applicant: Arrival Limited, London (GB)

(72) Inventors: Kirill Vladimirovich Krinkin, London (GB); Leonid Mikchailovich Lesin, London (GB)

(73) Assignee: Arrival Limited, London (GB)

( * ) Notice: Subject to any disclaimer, the term of this patent is extended or adjusted under 35 U.S.C. 154(b) by 260 days.

(21) Appl. No.: 16/682,564

(22) Filed: Nov. 13, 2019

(65) Prior Publication Data
US 2020/0148295 A1 May 14, 2020

(30) Foreign Application Priority Data
Nov. 13, 2018 (GB) ..................................... 1818474

(51) Int. Cl.
| | | |
|---|---|---|
| *B60K 7/00* | (2006.01) |
| *B60P 3/07* | (2006.01) |
| *B62K 11/00* | (2006.01) |
| *B60L 50/64* | (2019.01) |
| *B60D 1/01* | (2006.01) |

(Continued)

(52) U.S. Cl.
CPC ............ *B62K 11/007* (2016.11); *B60D 1/01* (2013.01); *B60K 7/0007* (2013.01); *B60L 50/64* (2019.02); *G01C 9/00* (2013.01); *G05D 1/0088* (2013.01); *B60K 2007/0061* (2013.01);

(Continued)

(58) Field of Classification Search
CPC ........ B62K 11/007; B60D 1/01; B60K 7/007; B60K 2007/0061
See application file for complete search history.

(56) References Cited

U.S. PATENT DOCUMENTS

| | | | |
|---|---|---|---|
| 7,559,385 B1 * | 7/2009 | Burt ..................... | B60K 7/0007 180/167 |
| 8,013,759 B1 * | 9/2011 | Aid ......................... | B60D 1/30 340/904 |

(Continued)

FOREIGN PATENT DOCUMENTS

| | | |
|---|---|---|
| EP | 2052953 | 4/2009 |
| GB | 768926 | 2/1957 |

(Continued)

OTHER PUBLICATIONS

GB Combined Search and Examination Report for corresponding GB Patent Application No. GB1818474.7 dated May 15, 2019, 8 pages.

(Continued)

*Primary Examiner* — Jacob D Knutson
(74) *Attorney, Agent, or Firm* — Lee & Hayes, P.C.

(57) ABSTRACT

An automatic guided vehicles (AGV) can include: motors, wheels, motor controllers, and batteries coupled to an elongated frame. The two wheels can be mounted on opposite sides of the elongated frame. The wheels can be coupled to motors which can be controlled by motor controllers. The motors and motor controllers can be attached to the frame. The center of gravity can be lower than the axis of rotation of the wheels so that the AGV will passively rotated into an upright position. A connector flange can be mounted on top of a payload holder column mounted to a center portion of the AGV frame. Objects can be mounted on or towed by the connector flange.

12 Claims, 6 Drawing Sheets

(51) Int. Cl.
  *G01C 9/00* (2006.01)
  *G05D 1/00* (2006.01)
  *B62B 5/00* (2006.01)

(52) U.S. Cl.
  CPC .............. *B60P 3/07* (2013.01); *B62B 5/0079* (2013.01); *G05D 2201/0216* (2013.01)

(56) References Cited

U.S. PATENT DOCUMENTS

| | | | | |
|---|---|---|---|---|
| 9,988,114 | B1 * | 6/2018 | Freakes | B62K 11/007 |
| 10,046,819 | B1 * | 8/2018 | Sellner | B60K 1/02 |
| 10,828,973 | B2 * | 11/2020 | Kossett | B60K 1/02 |
| 2006/0097683 | A1 | 5/2006 | Hosoda et al. | |
| 2010/0292840 | A1 * | 11/2010 | Ruan | B25J 5/007 700/259 |
| 2011/0071677 | A1 | 3/2011 | Stilman | |
| 2017/0083020 | A1 * | 3/2017 | Purwin | G05D 1/0891 |
| 2018/0029662 | A1 * | 2/2018 | Acciardi | B62K 21/12 |
| 2018/0141609 | A1 * | 5/2018 | Newhouse | B62K 13/08 |
| 2020/0331554 | A1 * | 10/2020 | Monzidelis | B62K 13/08 |

FOREIGN PATENT DOCUMENTS

| | | | | |
|---|---|---|---|---|
| GB | 897419 | | 5/1962 | |
| GB | 1542001 | | 3/1979 | |
| GB | 2094343 | | 9/1982 | |
| GB | 2094393 | | 9/1982 | |
| KR | 20130087798 | | 8/2013 | |
| WO | WO200245914 | | 6/2002 | |
| WO | WO2015094695 | | 6/2015 | |
| WO | WO-2015094695 | A1 * | 6/2015 | .......... G05D 1/0011 |
| WO | WO2017207978 | | 12/2017 | |

OTHER PUBLICATIONS

EPO Intention to Grant for corresponding EPO Patent Application No. 19208815.1 dated Apr. 9, 2021, 31 pages.
EP Search Report for corresponding EP Patent Application No. 19208815.1 dated May 27, 2020, 14 pages.
GB Examination Report for corresponding GB Patent Application No. GB1818474.7 dated Feb. 16, 2021, 5 pages.

* cited by examiner

TWO WHEEL AUTOMATIC GUIDED VEHICLES

This Application claims priority to Great Britain Application No. 1818474.7, filed Nov. 13, 2018, which is incorporated herein by reference.

FIELD OF INVENTION

The field of invention is the physical operations of the technological process, product design and assembling optimizations in robotized manufacturing.

BACKGROUND

In robotized manufacturing, systems must be configured with consideration of the physical operations of the technological process, product design and assembling optimizations. Robotized manufacturing can include automatic guided vehicles (AGV) which are portable robots that can follow markers or wires in the floor, or uses vision, magnets, or lasers for navigation. AGVs are most often used in industrial applications to move materials around a manufacturing facility or warehouse. AGV systems can include multiple battery powered AGV vehicles that navigate along pre-defined guided paths. AGV vehicles can navigate in the facility using several guidance technologies including floor-surface mounted magnetic tape or bars, lasers, optical sensors, and magnet/gyroscope based inertial guidance. These guidance technologies make it easy to change the routes of the AGV vehicles and expands the AGV system in response to facility changes for a flexible and scalable material handling solution. Robotized manufacturing requires a high degree of automation and flexible manufacturing systems, there is a number of requirements to automated logistics and delivery methods within the workshop: low-cost, high reliability, flexibility of the AGV system. What is needed are improved AGVs which can function independently and in cooperation with each other.

SUMMARY OF THE INVENTION

The AGV includes a left wheel coupled to a left motor and a right wheel coupled to a right motor. The rotational axis of the left wheel can be aligned with the rotational axis of the right wheel. The motors can be brushless DC motors which can be coupled to the wheels through planetary gears. A motor control unit can have wireless radio frequency communications. The AGV can comprise a radio frequency transceiver coupled to the motor controller. The motor control unit can control the left and right motors. The left motor, the right motor are mounted on a frame. A rechargeable battery can be coupled to the frame for powering the motor controller, the left motor and the right motor. A connector can be mounted on a center surface on the frame of the AGV. A payload holder column can be mounted on a center portion of the frame and a connector joint can be mounted on a top portion of the payload holder column. The frame and batteries can be below the rotational axis of the wheels so the weight of these components results in AGV remaining upright. More specifically, the center of gravity of the AGV can be below the rotational axis so the AGV will normally rotate to an upright position. Optionally, in some embodiments, only the left wheel and the right wheel of the AGV contact the ground.

In addition to or as an alternative mechanism to balance the AGV, tilt sensors and/or gyroscopic sensors can be used to detect the angle and rotational movement of the AGV. The tilt and gyroscopic sensors can communicate with a processor which can control motors that rotate the wheels which are driven forward or backward as needed to return the pitch of the AGV to an upright position. In some embodiments, the AGV can use brushless DC electric motors coupled to each wheel which are powered by lithium-ion or other rechargeable batteries.

The AGV can detect the vertical or upright angle of the AGV. If the vertical angle of the AGV is not within a predetermined range of angles, the motor controller can adjust the movement of the wheels to correct the vertical angle of the AGV and prevent AGV body from flipping over. For example, in an embodiment, the controller can require the AGV to be within 10 degrees of 90 degrees upright. The accelerometers can be configured in a vertical and horizontal orientation and the outputs of the vertical and horizontal accelerometers can be used to determine the vertical angle of the AGV. If the AGV is leaning back too far while the AGV is moving, the motor controller can slow the motors and wheels so that the deceleration force will cause the AGV to rotate about the axis of the wheels to a more upright position back to be within the predetermined vertical angle range.

In an embodiment, the AGV can be coupled to another device such as a trailer or additional AGVs. In these embodiments, the AGV can have a hitch mechanism which can be releasably coupled to a tow bar or tow mechanism having a connector. The connector can have a downward extending cylindrical shaft and the hitch mechanism can be a cylindrical hole which is vertically oriented in a top surface of the AGV. The inner diameter of the cylindrical hole can be slightly larger than the outer diameter of the connector.

In an embodiment the hitch mechanism integrated into the AGV can be the same or similar to the circular shim that surrounds an upper end of the cylindrical shaft. A lower surface of the circular shim can have a convex rounded surface and there is a recessed annular portion between the convex surface of the circular shim and the shaft. The connector joint can be within a head tube that has an inner cylindrical surface. The head tube can surround an upper rotational member and a lower rotational member. A holder cup is placed within the upper rotational member and the lower rotational member and the holder cup can rotate within the head tube. In different embodiments, the rotational member and the lower rotational member can be bushings, bearings (roller or ball), or any structures which can allow the holder cup to rotate in a lower friction manner within the head tube. In an embodiment the upper rotational member can be a radial bearing and the lower rotational member can be a thrust bearing which can provide radial support as well as axial support which can resist the downward force of the connector.

An elastomer holder is placed within an inner center cylindrical portion of the holder cup and half cylinder shells can be placed within a center hole in the elastomer holder. The outer and lower surfaces of the elastomer holder can be surrounded by the holder cup. The elastomer holder can surround the center hole of the connector joint and the upper surface of the elastomer holder can have a convex cross section, so that the upper surface can be the shape of an upper portion of a donut ring. When the connector is placed in the connector joint, the lower convex surface of the circular shim compresses against the upper surface of the elastomer holder. The lower apex diameter of the circular shim can be substantially the same as the upper apex diameter of the elastomer holder. This compression of the elastomer holder by the circular shim can cause the elastomer holder to extend inward moving the shells inward against outer cylindrical surface of the shaft. The compression of the shells against the shaft can help to hold the shaft in the connector to the connector joint.

The connector can be coupled to a trailer or a moving device such as an AGV that follows a towing device which can be an AGV. The shaft can be vertically oriented and when placed in the connector joint, the shaft orientation can cause the connector joint to remain in a vertical orientation. The connector joint can be mounted to an AGV. If the AGV is a two wheel design, the vertical orientation of the shaft can keep the AGV in an upright position even when a substantial towing force is applied to the connector shaft. In some embodiments, multiple AGVs can be coupled with connectors which are attached to each other by an elongated member so that the AGVs can be used in combination

DETAILED DESCRIPTION

Figure 1:
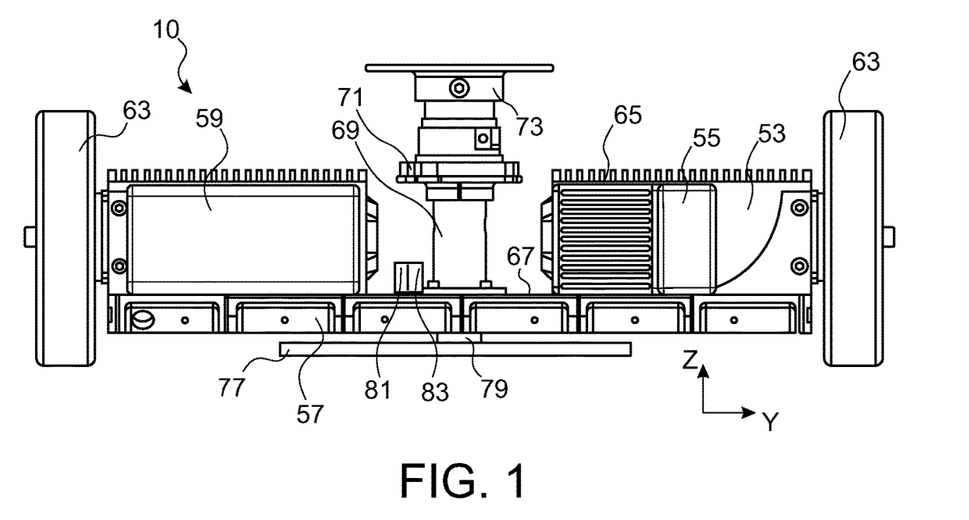
FIG. 1 illustrates a front view of an embodiment of an AGV.
Figure 2:
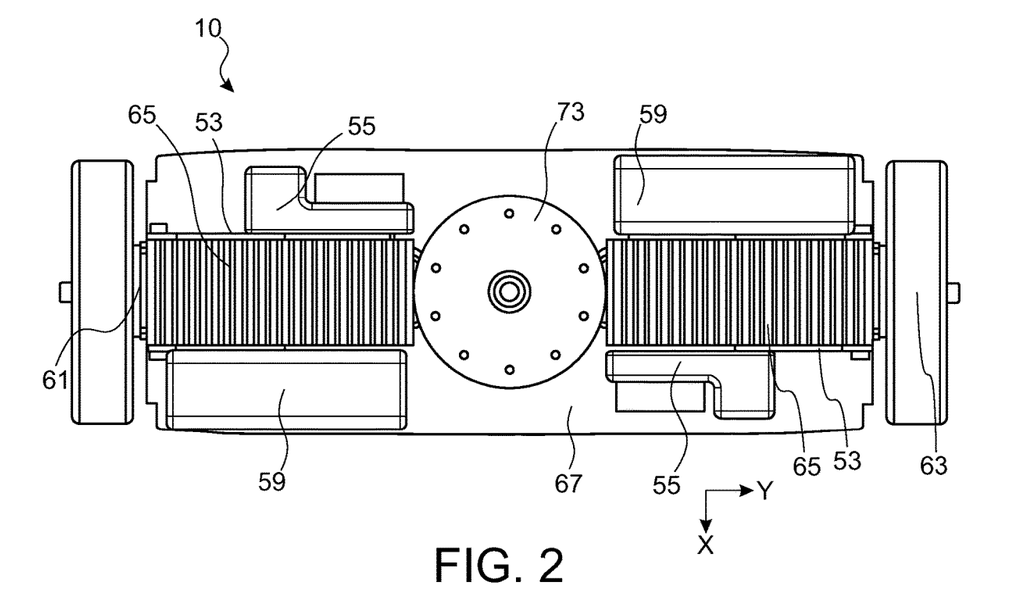
FIG. 2 illustrates a top view of an embodiment of an AGV.
Figure 3:
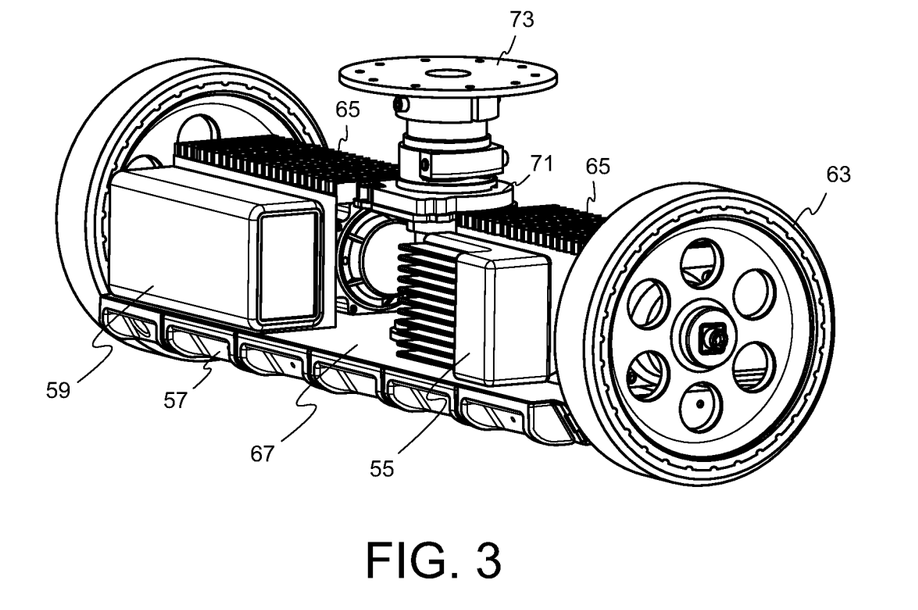
FIG. 3 illustrates a perspective view of an embodiment of an AGV.

FIG. 1 illustrates a front view, FIG. 2 illustrates a top view and FIG. 3 illustrates a perspective view of an embodiment of an automatic guided vehicle (AGV) 10 which can have two wheels 63 which are each driven by an electric motor 53. In an embodiment, the electric motors 53 can be brushless direct current (BLDC) motors. The motors 53 are powered by rechargeable batteries 57 and controlled by a motor controller 55. The motor controllers 55 can include a main controller circuit and electrical power switching mechanisms. For example, the motor controllers 55 can include a general purpose central processing unit (CPU) such as an Arduino controller and general purpose input/output (GPIO) mounted drivers. The CPU might also play a role of the controlling unit for additionally devices such as robot equipment, active grippers, holders, cameras, sensors, etc. mounted on the AGV 10.

The CPU might serve as a computational resource for AGV localization and navigation algorithms. The AGV 10 can also include communication means with wireless networks. The AGV can comprise a radio frequency transceiver coupled to the motor controller. For example, the communications mechanism can be a radio frequency (RF) device such as a Wi-Fi mechanism or any other RF communications transceiver system. In an embodiment a system controller can transmit navigational controls to a plurality of AGVs and each of the AGV 10 can transmit location information back to the system controller for feedback for the locations of the plurality of AGVs.

The AGV 10 may also include batteries 57 and a battery monitoring system. Because the batteries 57 can have a high weight, they can be mounted under the frame 67 below the center of rotation or the rotational axis of the wheels 63. The weight of the batteries 57 can help to passively keep the AGV 10 in the upright position. The batteries 57 can be charged and the AGV 10 can be operated. Depending on use-case, the batteries 57 might be replaced when the batteries 57 are fully discharged or depleted. Alternatively, the batteries 57 might be charged by moving the AGV 10 to a charging station so that the batteries 57 can be charged.

In the illustrated embodiment, the motors 53 and the motor controllers 55 can be mounted on an upper planar surface of a rectangular frame 67 which can be lower than the rotational axis of the wheels 63. In an embodiment, a protective material can be placed around the perimeter of the frame 67. The protective material can prevent damage to the AGV 10 in the event of a collision.

A payload holder column 69 can be mounted to a center of the upper surface of a rectangular frame 67. A lower portion of a rotation resolver 71 can be attached to the upper end or portion of the payload holder column 69 and a connection flange 73 can be coupled to an upper portion of the rotation resolver 71 which can be a rotational coupling. Thus, the connection flange 73 can rotate freely about the vertical Z axis relative to the payload holder column 69 and the frame 67. The connection flange 73 can be coupled to other objects and used as a towing connection for the AGV 10.

The motors 53 can be coupled to cooling plates 65 which can be heat sinks which can dissipate heat and keep the motors 53 and other AGV 10 components within the optimum working temperature. The cooling plate 65 can include a plurality of fins which provide a larger exposed area for convection heat transfer from the solid metal surfaces to the ambient air. The cooling plates 65 function as passive heat exchangers. In other embodiments, cooling of the AGV 10 components can be improved with an active cooling system which can include fans which can circulate cooler air over the fins of the cooling plates 65.

The electric motors 53 can be connected to the wheels directly or be coupled to a planetary gear assembly which is coupled to the wheels 63. In an embodiment, the planetary gear assembly can consist of sun and planet gears mounted so that the center of the planet gear revolves around the center of the sun gear. The planet and sun gears mesh so that their pitch circles roll without slip. A planetary gear train can be assembled so the planet gear rolls on the inside of the pitch circle of a fixed, outer gear ring, or ring gear, sometimes called an annular gear. In this case, the curve traced by a point on the pitch circle of the planet is a hypocycloid. The planetary gearing can reduce the rotational velocity of the electric motors 53 transmitted to the wheels 63. In an embodiment, the AGV 10 can have a brake system which can have various different implementations. For example, in an embodiment the AGV 10 can have an integrated vision or object detection mechanism. When an imminent collision is detected, the AGV 10 can actuate a brake mechanism to stop the movement of the AGV 10 immediately.

When proposed dual-wheeled AGV robot platform is used as a single unit, the vertical position must be guaranteed. Two types of stabilization are used: passive and active. Passive stabilization is ensured by the device composition, when the center of mass of the robot is below the axis of the wheels, which allows to move with relatively small acceleration (value depends on the particular implementation) with a load, which does not cause significant shift of the center of mass (value depends on implementation, should be no more than the weight of the mass below axis) without causing the robot to overturn. To assure passive stabilization, the moment of inertia of the robot must be higher than the moment on the driving wheels, which allows the robot to be a pendulum, and its resting state is determined by the position of the center of mass.

Active stabilization is necessary when a payload shifts the center of mass of the system above the axis of the driving wheels, thereby creating a reverse pendulum. The system is balanced by impulse control of the driving wheel motors, and the data on the position of the robot in space is determined by means of an inertial measurement unit (IMU). In some implementations a gyroscopic module might be used for this purpose. In cheaper implementations, the torque is controlled by balancing the driving wheels acceleration.

In an embodiment, the AGV 10 can have a stabilization system which can be part of the motor controller 55. The stabilization system can include accelerometers which are used to detect the orientation of the AGV 10. For example, the accelerometers can be mounted in an X and Z orientations to detect the vertical or upright angle of the AGV 10. If the vertical angle of the AGV 10 is not within a predetermined range of angles, the motor controllers 55 can adjust the movement of the wheels 63 to correct the vertical upright angle of the AGV 10 and prevent AGV body from flipping over. For example, the controller can require the AGV to be within 10 or less degrees of 90 degrees upright. If the AGV 10 is rotated too far back or forward about the y-Axis while the AGV is moving, the motor controllers 55 can adjust the rotational speeds of the motors 53 and wheels 63 so that the AGV 10 will return to an upright position with the frame 67 in a horizontal position within the predetermined angle range.

The proposed AGV robot might be gyrostabilized. In an embodiment with reference to FIG. 1, the AGV 10 can be gyrostabilized and have a gyroscope which can be a rotating disk 77 coupled to a gyroscope motor 79. The gyroscope can consist of any mass, typically a disc 77 or wheel coupled to a motor 79. The gyroscope can be mounted around a lower portion of the frame 67. The rotating disc 77 can maintain its orientation and can automatically counteract unwanted rotary movements of the frame 67 and AGV 10 about the vertical Z axis. In other embodiments, the gyroscope can be mounted within or under the frame 67.

In addition to or as an alternative mechanism to balance the AGV 10, tilt sensors 81 and/or gyroscopic sensors 83 can be used to detect the angle and rotational movement of the AGV 10. The tilt sensors 81 and gyroscopic sensors 83 can communicate with a processor controller 55 which can control motors 53 that rotate the wheels 63 which are driven forward or backward as needed to return the pitch of the AGV 10 to an upright position. In some embodiments, the AGV 10 can use brushless DC electric motors coupled to each wheel which are powered by lithium-ion or other rechargeable batteries. The AGV 10 can detect the vertical or upright angle of the AGV 10. If the vertical angle of the AGV 10 is not within a predetermined range of angles, the motor controller can adjust the movement of the wheels to correct the vertical angle of the AGV 10 and prevent AGV body or frame 67 from flipping over. For example, in an embodiment, the controller 55 can require the AGV 10 to be within 10 degrees of 90 degrees upright. The accelerometer sensors 81 can be configured in a vertical and horizontal orientation and the outputs of the vertical and horizontal accelerometer sensors 81 can be used to determine the vertical angle of the AGV 10. If the AGV 10 is leaning back too far while the AGV 10 is moving, the motor controller 55 can slow the motors 53 and wheels 63 so that the deceleration force will cause the AGV 10 to rotate about the axis of the wheels 63 to a more upright position back to be within the predetermined vertical angle range.

Figure 4:
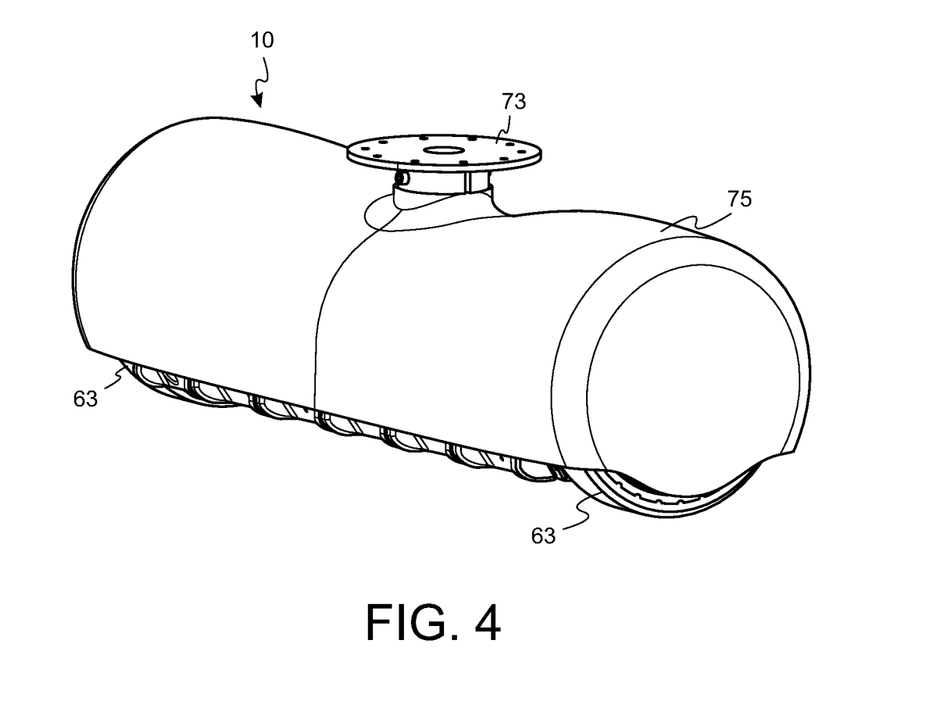
FIG. 4 illustrates a perspective view of an embodiment of an AGV with a covering.

With reference to FIG. 4, in an embodiment, it can be important to protect the moving components from ambient conditions such as dust, dirt, water, snow, etc. It can also be important to shield the AGV components from people and objects in the proximity of the AGV. In some embodiments, the AGV can have a rigid covering 75. In the illustrated embodiment, the covering 75 can be a smooth cylindrical structure which can completely cover the upper surfaces of the AGV 10 and the side surfaces of the wheels 63. The connection flange 73 extends out of a hole in the upper center surface of the covering 75. The connection flange 73 can rotate about a vertical axis. The lower portion of the rigid covering 75 can be open with the lower portions of the wheels 63 extending below the lower edge of the rigid covering 75 so that it does not interfere with the rolling movements of the wheels 63. The rigid covering 75 can protect the internal components of the AGV 10 when there is a collision or contact with the AGV 10 which can protect the AGV from damage. Further, the smoother outer surface of the covering 75 can prevent any sharp objects from contacting people or obstacles in the path of the AGV 10.

There are several limitations, which narrow the use of the uniaxial platform solely. a) The mass and shape of the carried object should not shift. The center of mass of the AGV can be at the geometric center of the frame 67 of an unloaded AGV. Values depend on the AGV implementation. The center of mass should be below the axis of rotation of the wheels. b) The location of the center of mass of the AGV that is carrying an object should be above center of mass of an unloaded AGV. This should assure the pendulum self-righting and further equilibrium. c) In an embodiment the maximum mass of the carried object is limited by implementation of the AGV. The stability of the AGV might be compensated by active stabilization systems and applied motor control algorithms. The center of the mass of the carried object may not necessarily be below the axis of rotation of the wheels (axis Z and X), in this case AGV will balance the cargo, moving the wheels with different acceleration when moving and rotating forward and backward or when staying on spot. This will guarantee the condition of the mass above the center of the mass of the unloaded AGV. In this embodiment the maximum mass of the carried object is limited to 500 kg. Table 1 includes a listing of physical characteristics and values for an embodiment of the AGV.

TABLE 1

| Characteristic | Value |
| --- | --- |
| Width × Depth × Height (mm) | 795 × 270 × 260 |
| Device weight | 45 kg * |
| | *Depending on assembly |
| Diameter of the wheels (mm) | 250 |
| Type of the drive | Electric, independent for both wheels |
| Rated total drive power (W): | 1200 |
| Rated total torque of drives (Nm) | 90 Nm |
| Allowable payload per unit (kg) | 500 |

The AGV robot implementation can be a dual-wheeled AGV fabricated with a variety of materials, sizes, and composition and placement of internal components. Additionally, mounted equipment such as robot grippers, handlers, cameras, sensors, trays are also considered to be a part of a particular implementation. There are variety of use-cases, when the AGV robot might be effectively applied. It can perform the functions of delivering components and parts, tools for robots, inspecting and controlling the factory, being a mobile surveillance system (if equipped with the camera), acting as a WiFi repeater, or acting as a mobile battery power charging point. The AGV could be used in dangerous spaces, chemically or radioactively poisoned places. If implemented in a small form factor, it may inspect/fix destinations unreachable for humans such as ventilation or sewerage systems. The AGV might be used for cabling as a cable puller in the channel.

Figure 5:
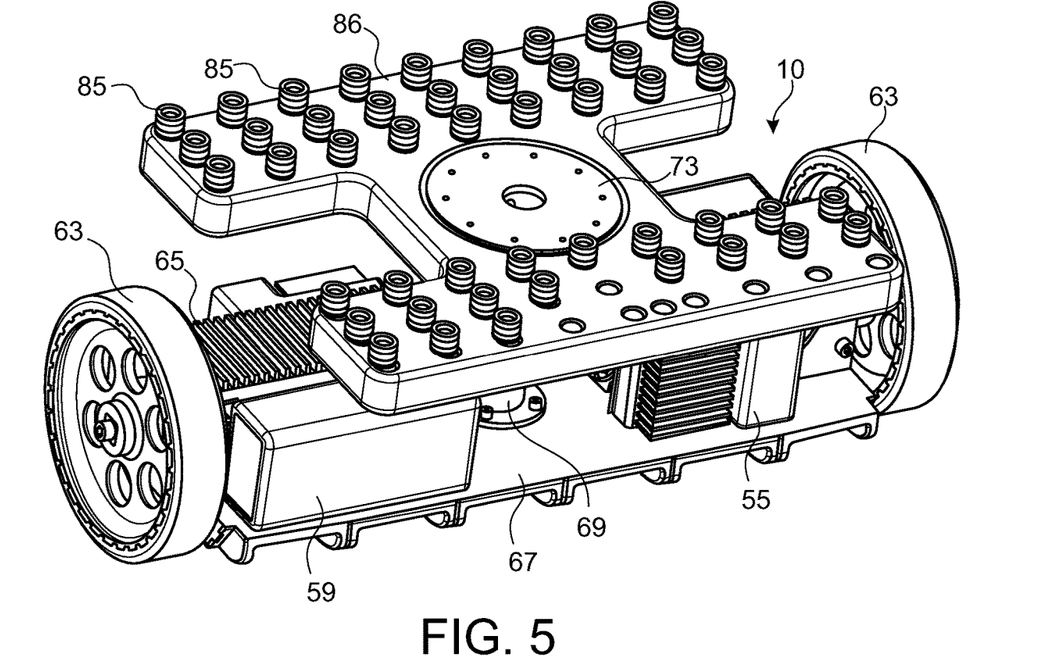
FIG. 5 illustrates a perspective view of an embodiment of an AGV with a sucker holder mechanism.

With reference to FIG. 5, an embodiment of an AGV 10 is illustrated that includes a sucker holder 86 which is coupled to a connection flange 73. The sucker holder 86 can include a plurality of elastic cylindrical ends 85 which can be coupled to a vacuum. Air is drawn inward through the plurality of elastic cylindrical ends 85. When an object is placed against the elastic cylindrical ends 85, the vacuum can apply a vacuum force which can secure the object to the elastic cylindrical ends 85. Thus, the sucker holder 86 can rotate with the connection flange 73.

In other embodiments, any other types of mechanisms can be coupled to the connection flange. With reference to FIG. 5, an embodiment of an AGV 10 is illustrated that includes a sucker holder 86 which is coupled to a connection flange 73. When a flat surface of an object is placed on the sucker holder 86, a vacuum can be applied which can hold the object to the sucker holder 86. When the AGV 10 and the object are moved to the destination location, the vacuum can be removed or discontinued from the sucker holder 86. The robot arm can then remove the part from the sucker holder 86 and the AGV 10.

Figure 6:
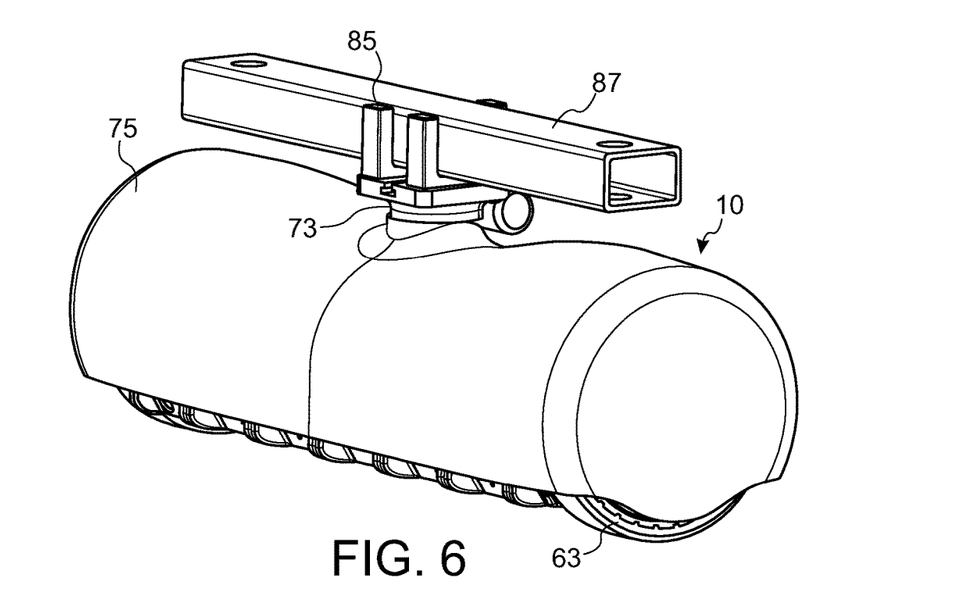
FIG. 6 illustrates a perspective view of an embodiment of an AGV with a clamp mechanism.

With reference to FIG. 6, an embodiment of an AGV 10 is illustrated that includes a three finger gripper 85 can be coupled to the connection flange 73. The gripper 85 can have an actuation mechanism which can close the gripper 85 on an object 87 and the gripper 85 can open to release the object 87. The AGV 10 can be configured to move to a specific position, open the gripper 85, receive an object 87 and close the gripper 85 on the object 87. Once the object 87 is securely attached to the gripper 85 and the AGV 10. The AGV 10 can then move with the object 87 to a predetermined location and the object 87 can be released by the gripper 85 and the object 87 can be received by another machine.

In an embodiment, the AGV can include an automatic hitch device, which allows AGVs the ability to connect to trailer or multiple AGVs mounting and decoupling automatically. The coupler of the AGV serves for controlled connection, retention and disconnection of the AGV robot from tools, rigging and other AGV robots or trailed dollies. While the figures illustrate the inventive hitch connection mechanism with AGVs, in other embodiments, the inventive hitch connection mechanism can be used with any other type of powered robotic transportation mechanism or any other type of towing system. Additionally, the inventive hitch system construction might be used as a connector for coupling robotic tools, grippers, carrying platforms, trays, or other devices to an AGV use. The inventive hitch is also applicable for various use-cases.

Figure 7:
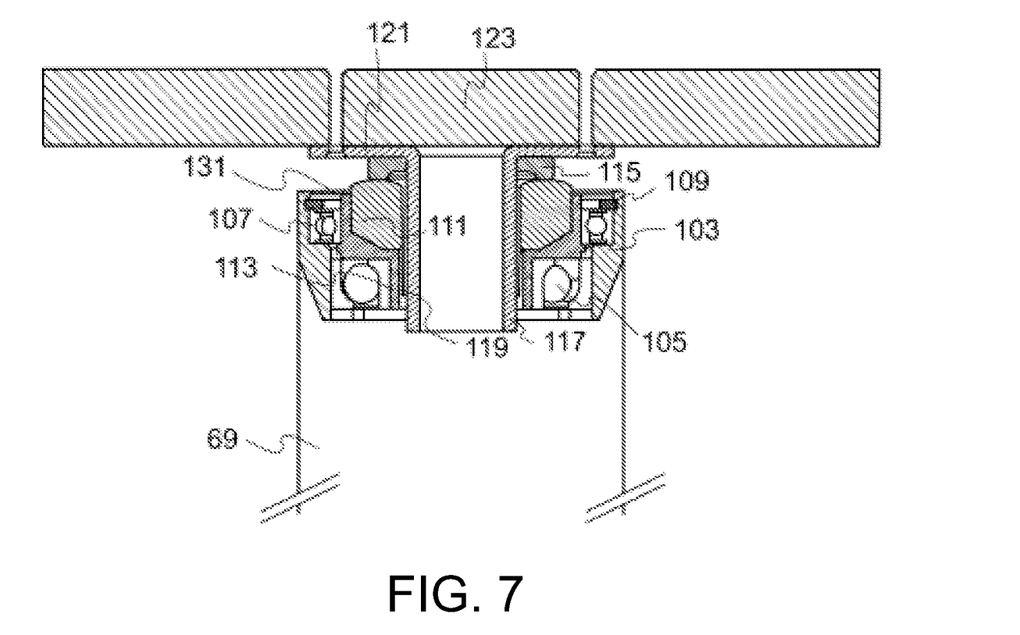
FIG. 7 illustrates a cross section view of an embodiment of a hitch connection mechanism.
Figure 8:
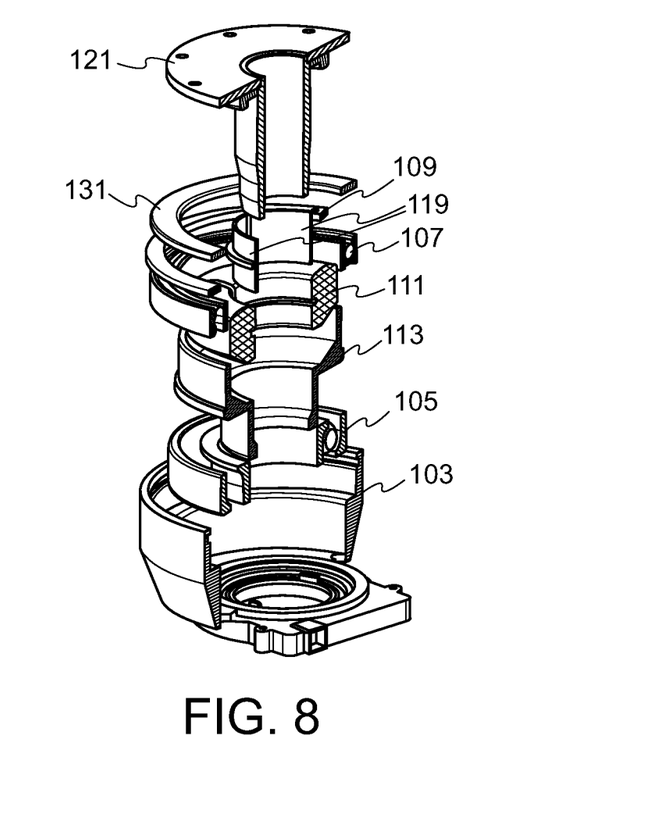
FIG. 8 illustrates an exploded view of an embodiment of a hitch connection mechanism.

FIG. 7 illustrates a cross section view of an embodiment of the hitch in a connected configuration and FIG. 8 illustrates an exploded view of an embodiment of the hitch. An AGV can be coupled to a connector with the connector mounted on the payload holding column 69 can rotate freely relative to the AGV. The hitch can include a connector and a connector joint. In the illustrated embodiment, the connector includes a connection shaft 117 which can be a cylindrical structure with a cylindrical outer surface. The connection shaft 117 can extend downward from a flange 121 which can be a planar structure. A circular shim 115 can be placed around the connection shaft 117 under the flange 121. The shim 115 can have a convex surface which extends downward.

In the illustrated example, the connector joint includes a head tube 103 which is coupled to a payload holding column of the AGV. In the illustrated embodiment, the head tube 103 can be bonded to the holding column of the AGV. The inner surfaces of the head tube 103 can include an upper cylindrical surface and a concentric lower cylindrical surface and there is a horizontal planar step between the upper cylindrical surface and a lower cylindrical surface. Bearings are mounted in the head tube 103. In an embodiment, an upper radial bearing 107 is mounted within the upper cylindrical surface of the head tube 103 and a lower thrust bearing 105 is mounted within the upper cylindrical surface of the head tube 103. The outer diameters of the upper radial bearing 107 can be substantially the same diameter as the inner diameter of the upper cylindrical surface of the head tube 103 and the outer diameter of the lower thrust bearing 105 can be substantially the same diameter as the inner diameter of the lower cylindrical surface of the head tube 103.

A holder cup 113 is mounted within the upper radial bearing 107 and the lower thrust bearing 105. The holder cup 113 can have an upper cylindrical surface and a lower cylindrical surface. The outer diameter of the upper cylindrical surface of the holder cup 113 can be substantially the same as the inner diameter of the upper radial bearing 107 and the outer diameter of the lower cylindrical surface of the holder cup 113 can be substantially the same as the inner diameter of the lower thrust bearing 105. A lock ring 109 can be compressed and placed within the inner diameter of the head tube 103 above the upper radial bearing 107. The lock ring 109 can then be placed in a groove formed in the inner diameter of the head tube 103 to hold the upper radial bearing 107, the holder cup 113 and the lower thrust bearing 105 in the head tube 103. In an embodiment, a dust cover 131 can be paced above the upper radial bearing 107 to prevent contaminants from ambient particles. The dust cover 131 can be placed within the inner diameter of the head tube above the upper radial bearing 107 against an upper portion of the holder cup 113. In an embodiment, the holder cup 113 has a protrusion which extends radially outward from the upper outer cylindrical surface of the cup holder 113. The lower surface of the inner diameter of the upper radial bearing can be adjacent to the protrusion to prevent cup holder 113 from being pulled upward out of the head tube 103 after the lock ring 109 has been installed in the head tube 103.

Although the hitch has been illustrated and described with the upper radial bearing 107 and the lower thrust bearing 105 as ball bearings, in other embodiments, other rotational mechanisms can be used such as bushings, needle bearings, roller bearings, roller thrust bearings, or any other mechanism which can allow the holder cup 113 to rotate freely within the head tube 103 with low friction under axial and radial loads.

An annular elastomer holder 111 is held within the holder cup 113 which can closely fit against the outer and lower surfaces of the elastomer holder 111. The holder cup 113 and the head tube 103 can be made of an inelastic material such as metal, a strong plastic, a strong composite material such as carbon fiber, or other suitable inelastic materials. The annular elastomer holder 111 can have an upper surface that is higher than all other components of the connector joint. The elastomer holder 111 can have a cylindrical outer surface and a cylindrical inner surface. The outer diameter of the elastomer holder 111 can be substantially the same or slightly smaller than the upper inner diameter of the holder cup 113. A first shell 119 and a second shell 119 can be placed against the cylindrical inner surface of the annular elastomer holder 111. The concave inner surfaces of the first shell 119 and the second shell 119 can each be half cylindrical surfaces. In an embodiment, the first shell 119 and the second shell 119 can each have a planar flange extending outward from convex half cylindrical outer surfaces. The planar flanges can be placed between a planar surface of the holder cup 113 and a lower edge of the annular elastomer holder 111. The planar flanges can prevent the first shell 119 and the second shell 119 from falling out of the connector joint. The concave inner surfaces of the first shell 119 and the second shell 119 can provide a sliding surface against which the connection shaft 117 can slide when the hitch is being connected and disconnected.

Although the inventive hitch connection system includes two half cylinder shells 119, in other embodiments, the two shells 119 can be replaced with a single piece cylinder shell which has a single slot across the length of the cylinder. As discussed, the inner diameter of the cylindrical surface of the elastomer holder 111 can contract when the upper surface is compressed by the circular shim 115. In this embodiment, the single piece cylinder shell can contract so the inner diameter decreases so that it is pressed against the connection shaft 117.

Figure 9:
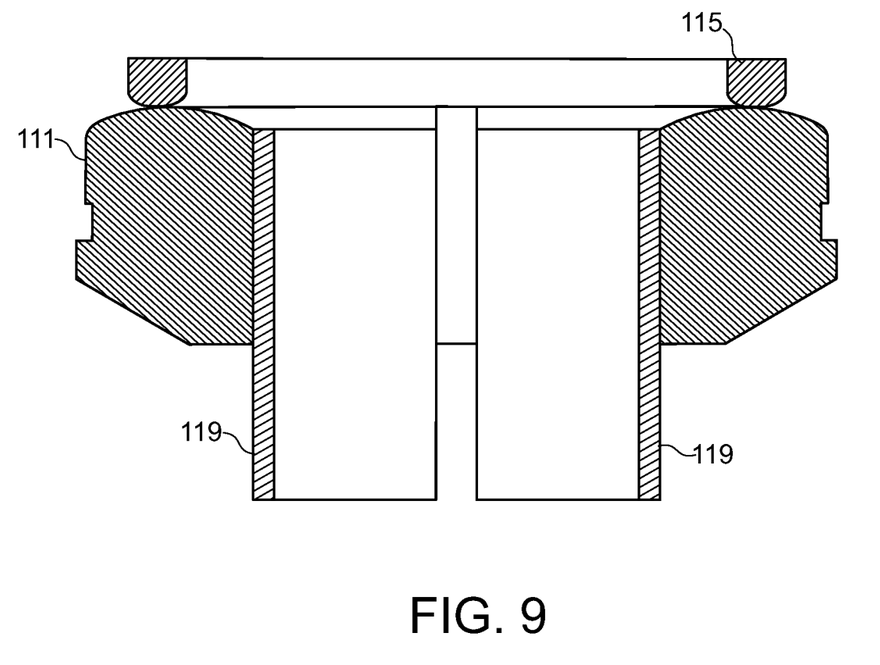
FIGS. 9 and 10 illustrate cross section views of annular elastomer holders, shells and circular shims.
Figure 10:
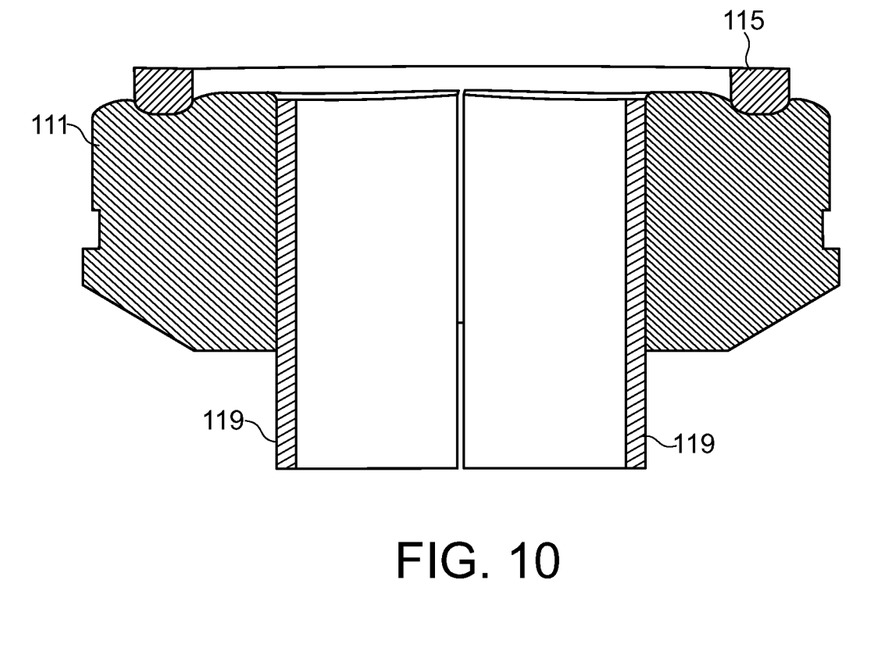

With reference to FIGS. 9 and 10, a more detailed cross section of an embodiment of the elastomer holder 111, the circular shim 115, the first shell 119 and the second shell 119 are illustrated. The upper surface of the elastomer holder 111 and the lower surface of the circular shim 115 can both be convex surfaces. When the upper surface of the elastomer holder 111 is compressed downward by the lower convex surface of the circular shim 115, the elastomer holder 111 can expand inward against the first shell 119 and the second shell 119. FIG. 9 illustrates the elastomer holder 111 in an uncompressed state where the circular shim 115 is in contact with the elastomer holder 111 but not deforming the upper surface. The elastomer holder 111 is not compressed and does not excerpt an inward force against the first shell 119 and the second shell 119. Thus, there is a gap between the first shell 119 and the second shell 119.

With reference to FIG. 10, a downward force is applied to the circular shim 115 which is pressed against the upper surface of the elastomer holder 111. The elastic material of the elastomer holder 111 is compressed and the inner diameter of the elastomer holder 111 contracts inward resulting in the first shell 119 and the second shell 119 moving towards each other. The circular shim 115 is pressed against the upper surface of the elastomer holder 111 when the connection shaft (not shown) is fully inserted into the elastomer holder 111 between the first shell 119 and the second shell 119. Thus, the first shell 119 and the second shell 119 would be compressed against the connection shaft. In the illustration, the first shell 119 and the second shell 119 are moved very close to each other due to the inward force of the compressed elastomer holder 111 since the connection shaft is not between the first shell 119 and the second shell 119.

When a downward force is applied to the circular shim 115 compressing the top of the elastomer holder 111, the shells 119 are compressed inward against the connection shaft shown in FIG. 3. This compression tends to secure the shells 119, the elastomer holder 111, the holder cup 113 and the inner race of the upper radial bearing 107 and the inner race of the lower thrust bearing 105 to the connection shaft 117. The upper radial bearing 107 and the lower thrust bearing 105 allow the connection shaft 117 the shells 119, the elastomer holder 111, and the holder cup 113 to all rotate about a vertical axis aligned with the center of the connection joint. The upper radial bearing 107 and the lower thrust bearing 105 transfer horizontal forces which are generated by the AGV to a structure coupled to the connection shaft 117. In general, there will be a downward force applied to the connection shaft 117 and the lower thrust bearing 105 which can transmit the vertical forces from the connection shaft 117 to the AGV.

In different embodiments, the elastomer holder 111 can be made of various elastic materials. In an embodiment, elastomer holder 111 can be made of strong elastic material such as polyurethane. However, in other embodiments, other suitable materials can include rubber materials such as: natural rubber, polyisoprene, polybutadiene, butyl rubber, styrene, nitrile rubber, ethylene, propylene, polyacrylic, silicon, fluoroelastomers, ethylene vinyl, etc. The elastomer holder 111 material can have a hardness that can provide industrial strength and hardness to prevent damage when exposed to hard forceful contact with the connection shaft 117.

In the illustrated embodiments, the outer and lower surfaces of the elastomer holder 111 are in direct contact with the inner upper surfaces of the holder cup 113 and the inner cylindrical surface of the elastomer holder 111 is in direct contact with the outer cylindrical surfaces of the shells 119. The upper convex surface of the elastomer holder 111 can be exposed and the highest portion of the connector joint. The apex of the upper convex surface of the elastomer holder 111 can define a circle having a diameter that can be midway between the inner and outer cylindrical diameters of the elastomer holder 111. The circular shim 115 can have a convex surface which can extend downward. The lower surface of the circular shim 115 can have substantially the same diameter as the apex of the elastomer holder 111. When the circular shim 115 is pressed into the upper surface of the elastomer holder 111, the elastic material can conform to the convex surface of the circular shim 115. Because the upper, lower and outer surface of the elastomer holder 111 are against solid surfaces, the elastomer holder 111 can only move inward as illustrated in FIG. 10.

Figure 11:
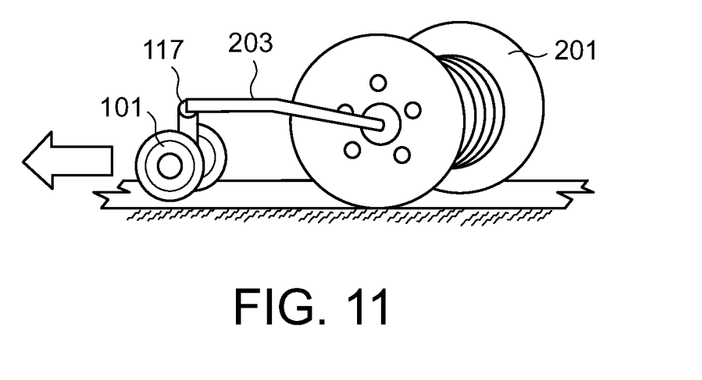
FIGS. 11-13 illustrate embodiments of AGVs which utilize the inventive hitch.

In different embodiments, the AGV 101 can be used to tow various objects. With reference to FIG. 11, the AGV 101 can be used to tow a spool 201 which is coupled to a tow bar 203. The spool 201 is coupled to one end of the tow bar 203 and the opposite end is coupled to a vertical connection shaft 117. The connection joint is placed at the upper center portion of the AGV 101. The hitch is coupled when the connection shaft is placed in the connection joint and the AGV 101 can pull the spool 201 to any location. The vertical orientation of the connection shaft 117 allows the AGV 101 to rotate relative to the tow bar 203 so the spool 201 can be towed to any desired location. A mechanism can be used to pull the tow bar 203 and connection shaft 117 up and out of the connector joint. The AGV 101 can then be used to move other objects.

Figure 12:
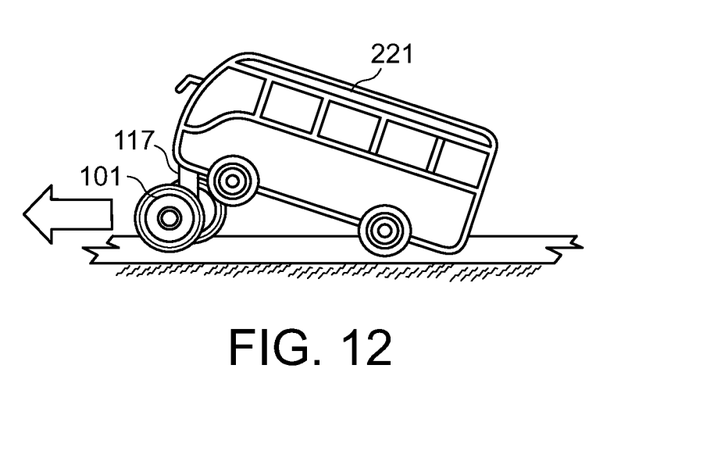
Figure 13:
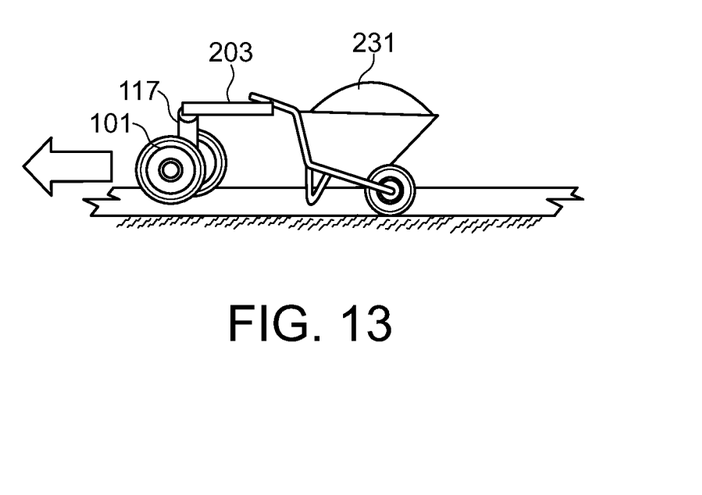

With reference to FIG. 12, in an embodiment, the AGV 101 can be a large device which is capable of towing a large vehicle 221 such as a bus. In the illustrated embodiment, a front portion of the vehicle 221 can be coupled to a connection shaft 117 which can be inserted into a connector joint on the AGV 101. The front wheels of the vehicle 221 can be raised off the ground and the rear wheels can roll over the pavement when the vehicle 221 is towed by the AGV 101. With reference to FIG. 13, an AGV 101 can be used to pull smaller structures such as wheelbarrow 231. In this embodiment, the vertical connection shaft 117 can be coupled to the handle portion of the wheelbarrow 231. In other embodiments, the inventive hitch can be used with any movable structure.

The invention is the universal platform, constructor, standard easily coupled mechanical, electronic and software components for building scalable logistics solutions and mobile transport robots of any complexity. The invention is the automated guided vehicle, which is movable in all directions. The route of the proposed AGV platform is not necessarily must be pre-defined, it might be dynamically changed in real-time. The invention scales horizontally and vertically. The invention eliminates the need to design/purchase dedicated mechanisms (AGVs) for transporting the loads. Number of known shapes and functions of AGVs might be implemented using proposed approach. The invention allows to decrease optimize the logistics in the assembly factory.

AGVs can be used individually or in combination with other AGVs can be used in a variety of areas to support processing and handling throughout a facility or outside the facility. In an assembly embodiment, the AGV can be used for moving products through production processes. In a kitting embodiment, the AGV can collect parts which can be delivered to a machine or worker for assembly. In an embodiment, the AGV can be used for part transportation. Robots can place parts onto pallets which can be moved with the AGV. The AGV can also be used to move loose parts. The AGV can be used for staging by delivering pallets of parts for production processes. The AGVs can be used in warehouse applications where they can be used for moving products. For example, finished goods can be wrapped in protective stretch wrappers and the AGV can move the wrapped goods from stretch wrappers to docks or storage. The AGVs can be used for order picking where the AGV moves ordered products to trailer-loading area for distribution and transporting a platform for a picker to place selected items upon. The AGVs can be used for assembly with where parts are delivered to assembly just-in-time (JIT) delivery. The AGV can be used for towing trailers of parts/materials to consumption points where they can be used for assembly. The AGVs can also be used for transfer to shuttle or transfer loads across high traffic aisles. In an embodiment, the AGVs can be used for surveillance by equipping the AGV with cameras and sensors which can communicate with a computing device through a radio frequency transmitter. The AGV platform might be effectively applied at various industries including: Automotive, Beverage, Chemicals, Commercial printing, Food, Hospital, Manufacturing, Newspaper, Paper, Pharmaceutical, Plastics, Warehousing and distribution etc. The AGV can also be used for operation in dangerous for human spaces.

The present disclosure, in various embodiments, includes components, methods, processes, systems and/or apparatus substantially as depicted and described herein, including various embodiments, sub combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, e.g., for improving performance, achieving ease and/or reducing cost of implementation. Rather, as the flowing claims reflect, inventive aspects lie in less than all features of any single foregoing disclosed embodiment.

The invention claimed is:

1. An automated guided vehicle (AGV) comprising:
a frame;
a left wheel coupled to a left motor mounted on the frame;
a right wheel coupled to a right motor mounted on the frame;
a motor controller that controls the left motor and the right motor;
a radio frequency transceiver coupled to the motor controller;
a rechargeable battery coupled to the frame for powering the motor controller, the left motor and the right motor;
a payload holder column mounted on a center of an upper surface on the frame of the AGV; and
a connector joint coupled to the payload holder column, the connector joint comprising: a head tube, a lower rotational member within a lower portion of the head tube, an upper rotational member within an upper portion of the head tube, a holder cup having an upper cylindrical portion within the upper rotational member and a lower cylindrical portion within the lower rotational member, an annular elastomer holder within the upper cylindrical portion of the holder cup, and a first shell placed against a cylindrical inner surface of the annular elastomer holder.

2. The AGV of claim 1 wherein the left wheel and the right wheel have an axis of rotation and a center of gravity of the AGV is below the axis of rotation.

3. The AGV of claim 1 wherein the rechargeable battery is mounted to a lower surface of the frame.

4. The AGV of claim 1 further comprising an accelerometer coupled to the motor controller for detecting a pitch angle of the AGV wherein the motor controller adjusts rotational velocities of the left motor and the right motor to prevent the pitch angle of the AGV from exceeding a predetermined maximum pitch angle.

5. The AGV of claim 1 further comprising:
a covering having a cylindrical surface which covers a left side, a right side, a front side, a rear side and a top side of the AGV.

6. The AGV of claim 1 further comprising:
a gyroscope coupled to the frame for stabilizing a vertical orientation of the AGV.

7. The AGV of claim 1 further comprising:
an accelerometer or a gyroscope for measuring a vertical orientation, coupled to the motor controller.

8. The AGV of claim 1 further comprising:
a rotation resolver coupled to the payload holder column.

9. The AGV of claim 1 wherein the lower rotational member is a thrust bearing which supports an axial load from a connector.

10. The AGV of claim 1 wherein the upper rotational member is a radial bearing.

11. The AGV of claim 1 wherein an inner diameter of the lower rotational member is smaller than an inner diameter of the upper rotational member.

12. The AGV of claim 1 wherein when a connector is placed in the connector joint, the upper rotational member and the lower rotational member allow the holder cup, the annular elastomer holder, and the first shell to rotate axially with the connector within the head tube.

* * * * *